US012394583B2

(12) United States Patent
Zhong et al.

(10) Patent No.: US 12,394,583 B2
(45) Date of Patent: Aug. 19, 2025

(54) HINGE TYPE BISTABLE MAGNETIC CIRCUIT STRUCTURE AND MAGNETIC LATCHING RELAY

(71) Applicant: Xiamen Hongfa Electric Power Controls Co., Ltd., Xiamen (CN)

(72) Inventors: Shuming Zhong, Xiamen (CN); Zhongbo He, Xiamen (CN); Yan Chi, Xiamen (CN); Wenguang Dai, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 87 days.

(21) Appl. No.: 18/261,536

(22) PCT Filed: Jan. 13, 2022

(86) PCT No.: PCT/CN2022/071856

§ 371 (c)(1),
(2) Date: Jul. 14, 2023

(87) PCT Pub. No.: WO2022/152219

PCT Pub. Date: Jul. 21, 2022

(65) Prior Publication Data

US 2024/0087827 A1 Mar. 14, 2024

(30) Foreign Application Priority Data

Jan. 15, 2021 (CN) ......................... 202110054313.5

(51) Int. Cl.
*H01H 50/24* (2006.01)
*H01H 50/36* (2006.01)
*H01H 50/44* (2006.01)

(52) U.S. Cl.
CPC ....... *H01H 50/24* (2013.01); *H01H 2050/367* (2013.01); *H01H 2050/446* (2013.01)

(58) Field of Classification Search
None
See application file for complete search history.

(56) References Cited

U.S. PATENT DOCUMENTS 4,339,734 A * 7/1982 Minks ................ H01H 51/2236
335/78
4,475,093 A 10/1984 Kobler
(Continued)

FOREIGN PATENT DOCUMENTS

CN 1396614 A 2/2003
CN 202855650 U 4/2013
(Continued)

OTHER PUBLICATIONS

First Office Action for CN Patent Application No. 202110054313.5 of Dec. 19, 2024.

(Continued)

*Primary Examiner* — Bernard Rojas
(74) *Attorney, Agent, or Firm* — Perilla Knox & Hildebrandt LLP; Kenneth A. Knox

(57) ABSTRACT

A hinge type bistable magnetic circuit structure, including a coil assembly, an L-shaped armature, an L-shaped yoke and a permanent magnet the L-shaped armature is configured on a side of the L-shaped yoke after rotating 180 degrees, and the two are together formed a frame-shaped profile, at two opposite diagonals of the frame-shaped profile, a junction is provided with a pre-set first gap; the L-shaped yoke includes a first and a second yoke portion, the coil assembly is arranged at and cooperated with the first yoke portion, one end of the permanent magnet is connected with the first yoke portion; the L-shaped armature includes a first and a second armature portion, the first armature portion is configured to cooperated with the other end of the permanent magnet so as
(Continued)

to be able to perform a seesaw type movement, thereby forming a bistable magnetic circuit.

19 Claims, 18 Drawing Sheets

(56) References Cited

U.S. PATENT DOCUMENTS

| | | | | |
|---|---|---|---|---|
| 4,912,438 | A | 3/1990 | Yokoo | |
| 5,015,978 | A | 5/1991 | Yokoo et al. | |
| 5,270,674 | A | 12/1993 | Nakanishi et al. | |
| 5,894,254 | A | 4/1999 | Reiter et al. | |
| 7,477,119 | B2 * | 1/2009 | Wu | H01H 50/043 335/83 |
| 8,461,951 | B2 | 6/2013 | Gassmann et al. | |
| 2002/0135446 | A1 * | 9/2002 | Takano | H01H 50/026 335/128 |
| 2007/0229203 | A1 * | 10/2007 | Mikl | H01H 51/2227 335/78 |
| 2014/0055220 | A1 | 2/2014 | Sumino et al. | |
| 2021/0012989 | A1 | 1/2021 | Lin et al. | |

FOREIGN PATENT DOCUMENTS

| | | | |
|---|---|---|---|
| CN | 103489717 | A | 1/2014 |
| CN | 106024529 | A | 10/2016 |
| CN | 106409611 | A | 2/2017 |
| CN | 108807081 | A | 11/2018 |
| CN | 208336100 | U | 1/2019 |
| CN | 110335788 | A | 10/2019 |
| CN | 209880500 | U | 12/2019 |
| CN | 112885646 | A | 6/2021 |
| CN | 215118788 | U | 12/2021 |
| EP | 3629356 | A1 | 4/2020 |
| JP | S54105768 | A | 8/1979 |
| JP | S6298701 | A | 5/1987 |
| JP | S63301441 | A | 12/1988 |
| JP | H0193022 | A | 4/1989 |
| JP | H06231948 | A | 8/1994 |
| JP | H10321110 | A | 12/1998 |
| JP | 2010176847 | A | 8/2010 |
| JP | 2014044840 | A | 3/2014 |

OTHER PUBLICATIONS

Extended European Search Report for EP Patent Application No. 22739095.2 of Nov. 14, 2024.

First Office Action for Japan (JP) Patent Application No. 2023-542939 of Sep. 3, 2024.

International Search Report for International Application No. PCT/CN2022/071856 mailed Mar. 4, 2022.

* cited by examiner

HINGE TYPE BISTABLE MAGNETIC CIRCUIT STRUCTURE AND MAGNETIC LATCHING RELAY

CROSS-REFERENCE TO RELATED APPLICATIONS

The present disclosure is a national phase application under 35 U.S.C. § 371 of International Application No. PCT/CN2022/071856, filed on Jan. 13, 2022, which claims the benefit of and priority to Chinese Patent Application No. 202110054313.5, titled "HINGE TYPE BISTABLE MAGNETIC CIRCUIT STRUCTURE AND MAGNETIC LATCHING RELAY", filed on Jan. 15, 2021, the entire contents thereof are incorporated herein by reference.

TECHNICAL FIELD

The present disclosure relates to the technical field of relays and, in particular, to a hinge type bistable magnetic circuit structure and a magnetic latching relay.

BACKGROUND

The bistable magnetic circuit structure is a structure in which a permanent magnet is provided in the magnetic circuit structure, and the permanent magnet is used to form a two-way magnetic circuit in a state where the movable and stationary contacts of the relay are open and closed, the magnetic field circuit generates a holding force on the action of the movable component (e.g., armature), which in turn achieves the open and closed holding state of the movable and stationary contacts of the relay, the coil is only excited at the moment of opening and closing of the movable and stationary contacts, and the coil does not need to be charged to maintain, which has a good energy-saving effect. However, in the related art, the product of the bistable magnetic circuit has a complex structure, many parts, complex processing technology, high manufacturing cost, and complicated assembly.

SUMMARY

According to one aspect of the present disclosure, a hinge type bistable magnetic circuit structure is provided, including a coil assembly, an L-shaped armature, an L-shaped yoke and a permanent magnet; where, the L-shaped armature is configured on a side of the L-shaped yoke after rotating 180 degrees, and the L-shaped armature and the L-shaped yoke are together formed a frame-shaped profile, at two opposite diagonals of the frame-shaped profile, a junction of the L-shaped armature and the L-shaped yoke is provided with a pre-set first gap; the L-shaped yoke includes a first yoke portion and a second yoke portion which are together formed an L shape, the coil assembly is arranged at and cooperated with the first yoke portion, one end of the permanent magnet is connected with the first yoke portion of the L-shaped yoke; the L-shaped armature includes a first armature portion and a second armature portion which are together formed an L shape, the first armature portion of the L-shaped armature is configured to cooperate with the other end of the permanent magnet so as to be able to perform a seesaw type movement, thereby forming a bistable magnetic circuit between the permanent magnet and the structurally asymmetrical L-shaped armature and the L-shaped yoke, and realizing a switching between two stable states of the bistable magnetic circuit by using an excitation of the coil assembly.

According to an exemplary embodiment of the present disclosure, the first armature portion of the L-shaped armature and the first yoke portion of the L-shaped yoke are on two opposite sides of the frame-shaped profile; one end of the permanent magnet is perpendicular to and is connected with the first yoke portion of the L-shaped yoke in an interior of the frame-shaped profile enclosed by the L-shaped armature and the L-shaped yoke, and two end surfaces of the permanent magnet are magnetic pole surfaces.

According to an exemplary embodiment of the present disclosure, an inner side surface of a tail end of the first armature portion of the L-shaped armature is configured to correspond to an end surface of the second yoke portion of the L-shaped yoke, an inner side surface of a tail end of the first yoke portion of the L-shaped yoke is configured to correspond to an end surface of the second armature portion of the L-shaped armature.

According to an exemplary embodiment of the present disclosure, the bistable magnetic circuit includes a first magnetic circuit passing through the permanent magnet, a section of the first armature portion of the L-shaped armature, the second yoke portion of the L-shaped yoke, a section of the first yoke portion of the L-shaped yoke, and a second magnetic circuit passing through the permanent magnet, another section of the first armature portion of the L-shaped armature, the second armature portion of the L-shaped armature, and another section of the first yoke portion of the L-shaped yoke.

According to an exemplary embodiment of the present disclosure, in the bistable magnetic circuit, the L-shaped armature is in a stable state when the inner side surface of the tail end of the first armature portion of the L-shaped armature is in contact with the end surface of the second yoke portion of the L-shaped yoke so that a first gap at one of the two opposite diagonals of the frame-shaped profile is smaller than a first gap at the other one of the two opposite diagonals; the L-shaped armature is in another stable state when the inner side surface of the tail end of the first yoke portion of the L-shaped yoke is in contact with the end surface of the second armature portion of the L-shaped armature so that the first gap at the other one of the two opposite diagonals of the frame-shaped profile is smaller than the first gap at the one of the two opposite diagonals.

According to an exemplary embodiment of the present disclosure, the permanent magnet is located between the middle of the first yoke portion of the L-shaped yoke and the middle of the first armature portion of the L-shaped armature.

According to an exemplary embodiment of the present disclosure, a length of the first armature portion of the L-shaped armature is greater than a length of the second armature portion of the L-shaped armature; a length of the first yoke portion of the L-shaped yoke is greater than a length of the second yoke portion of the L-shaped yoke.

According to an exemplary embodiment of the present disclosure, the coil assembly includes a bobbin and an enameled wire wound in a winding window of the bobbin, the first yoke portion of the L-shaped yoke is inserted in a core mounting hole of the bobbin, in the middle of the winding window, the bobbin is provided with a permanent magnet mounting hole facing the first armature portion of the L-shaped armature, the permanent magnet mounting hole is communicated with the core mounting hole, and the permanent magnet is fitted in the permanent magnet mounting hole of the bobbin.

According to an exemplary embodiment of the present disclosure, the first armature portion of the L-shaped armature is configured to uses the other end of the permanent magnet as a rotational support point, so that the first armature portion is capable of swinging to cooperate with the L-shaped yoke, thereby achieving a seesaw type movement.

According to an exemplary embodiment of the present disclosure, a projecting first projection is provided on an end surface of the other end of the permanent magnet, the first projection is integrally formed with the permanent magnet, the first projection of the permanent magnet is abutted against an inner side surface of the first armature portion of the L-shaped armature, so that the first armature portion of the L-shaped armature is configured to use the other end of the permanent magnet as a rotational support point to be capable of swinging to cooperate with the L-shaped yoke.

According to an exemplary embodiment of the present disclosure, a projecting second projection is provided on an inner side surface of the first armature portion of the L-shaped armature, and the second projection is integrally formed with the first armature portion, the second projection of the first armature portion of the L-shaped armature is configured to abut against an end surface of the other end of the permanent magnet, so that the first armature portion of the L-shaped armature is configured to use the other end of the permanent magnet as a rotational support point to be capable of swinging to cooperate with the L-shaped yoke.

According to an exemplary embodiment of the present disclosure, a magnetic conductor is provided between the other end of the permanent magnet and the first armature portion of the L-shaped armature, one end of the magnetic conductor connected with the first armature portion of the L-shaped armature is provided with a projecting third projection, the third projection is integrally formed with the magnetic conductor, so that the first armature portion of the L-shaped armature is configured to use a corresponding end of the magnetic conductor as a rotational support point to be capable of swinging to cooperate with the L-shaped yoke.

According to an exemplary embodiment of the present disclosure, a limit rotation shaft is provided on each side of the first armature portion of the L-shaped armature in a width direction, and a center line of the limit rotation shaft is vertically intersected with a connecting line or an extension line of the connecting line from one end to the other end of the permanent magnet and passing through the rotational support point; the bobbin is provided with a fourth projection extending toward the first armature portion of the L-shaped armature, the fourth projection is provided with a groove adapted to the limit rotation shaft of the first armature portion of the L-shaped armature, the limit rotation shaft of the L-shaped armature is rotatably fitted in the groove of the fourth projection of the bobbin.

According to an exemplary embodiment of the present disclosure, the center line of the limit rotation shaft is coincided with the rotational support point.

According to an exemplary embodiment of the present disclosure, the groove of the fourth projection of the bobbin is in arc contact with and is cooperated with the limit rotation shaft of the L-shaped armature.

According to an exemplary embodiment of the present disclosure, the limit rotation shaft of the L-shaped armature is a fifth projection integrally formed on both sides in the width direction of the first armature portion of the L-shaped armature.

According to an exemplary embodiment of the present disclosure, the first armature of the L-shaped armature is partially covered with a plastic member, the limit rotation shaft of the L-shaped armature is a sixth projection integrally molded on the plastic member on both sides in the width direction of the first armature portion of the L-shaped armature.

According to an exemplary embodiment of the present disclosure, a pressure spring is further provided and connected to the first armature portion of the L-shaped armature, and the first armature portion of the L-shaped armature is connected to the bobbin through the pressure spring.

According to an exemplary embodiment of the present disclosure, the pressure spring includes a main piece and wings, the wings are bent from two side edges of the main piece and protruded from one side surface, a side surface of the first armature portion of the L-shaped armature facing away from the first yoke portion of the L-shaped yoke is provided with a convex part protruding outward, the main piece is provided with a first snap-fit hole, the first snap-fit hole of the main piece is correspondingly fitted with the convex part of the first armature portion of the L-shaped armature; the wings of the pressure spring are configured to extend to the bobbin and are connected with the bobbin.

According to an exemplary embodiment of the present disclosure, a wing of the pressure spring is provided with a second snap-fit hole, a block is provided at a corresponding position of the bobbin, the second snap-fit hole of the wing of the pressure spring is stuckly fitted with the block of the bobbin.

According to an exemplary embodiment of the present disclosure, the second snap-fit hole of the wing of the pressure spring is elongated, one side of the second snap-fit hole is provided with a clamping piece; the block is provided with an inclined surface on a side facing the main piece of the pressure spring, and the block is also provided with a straight surface on a side facing away from the main piece of the pressure spring; the clamping piece of the second snap-fit hole is fitted with the straight surface of the block.

According to an exemplary embodiment of the present disclosure, the first armature portion of the L-shaped armature is provided with a concave portion on a side facing away from the first yoke portion of the L-shaped yoke, the pressure spring is provided with an elastic tongue corresponding to the concave portion, the elastic tongue of the pressure spring is configured to abut against the concave portion of the first armature portion of the L-shaped armature.

According to an exemplary embodiment of the present disclosure, a pre-set second gap is provided between the first armature portion of the L-shaped armature and the other end of the permanent magnet; a rotation shaft is provided at each of both sides of the L-shaped armature in a width direction and corresponds to an extension line of a connecting line from one end to the other end of the permanent magnet, so as to use the rotation shaft to achieve a seesaw type movement; the bobbin is provided with a support for supporting the rotation shaft of the L-shaped armature.

According to another aspect of the present disclosure, a magnetic latching relay is provided, including a base, a stationary spring part, a movable spring part, a pushing card and the hinge type bistable magnetic circuit structure according to any one of claims 1 to 23, the hinge type bistable magnetic circuit structure, the stationary spring part and the movable spring part are mounted on the base respectively, the pushing card is connected between the first armature portion of the L-shaped armature of the hinge type bistable magnetic circuit structure and the movable spring of the movable spring part.

According to an exemplary embodiment of the present disclosure, the base and the bobbin of the coil assembly of the hinge type bistable magnetic circuit structure are one-piece injection molded parts, and the base is provided with a through hole to facilitate the installation of the L-shaped armature.

The present disclosure will be further described in detail below with reference to the accompanying drawings and embodiments. However, the hinge type bistable magnetic circuit structure and magnetic latching relay is not limited to the embodiments.

DETAILED DESCRIPTION

First Embodiment

Figure 1:
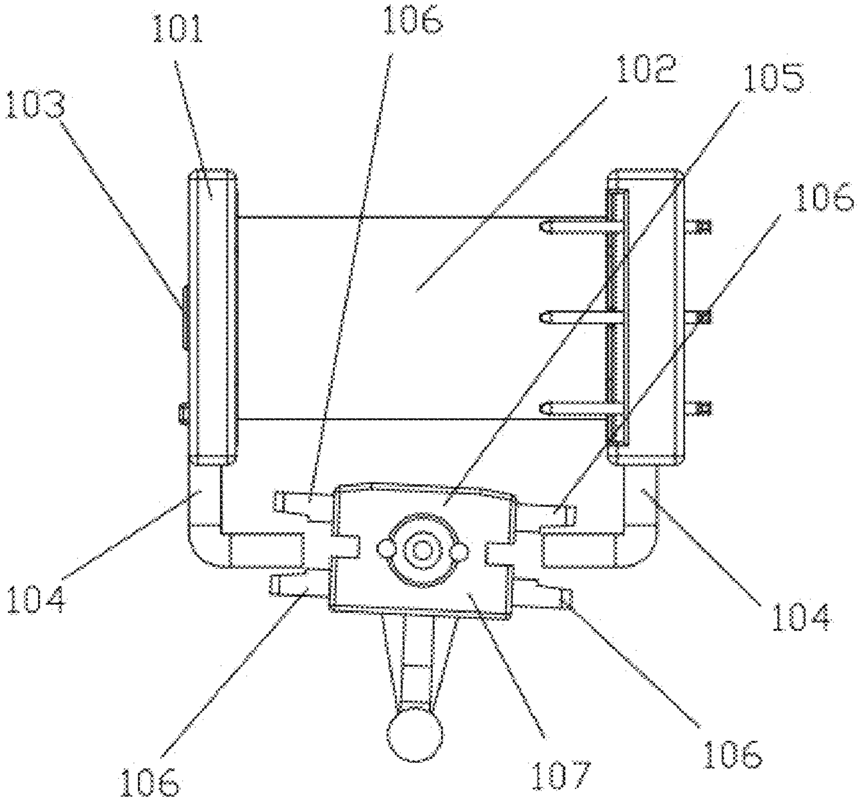
FIG. 1 (Prior Art)
FIG. 1 is a schematic diagram of a hinge type bistable magnetic circuit structure in the related art.
Figure 2:
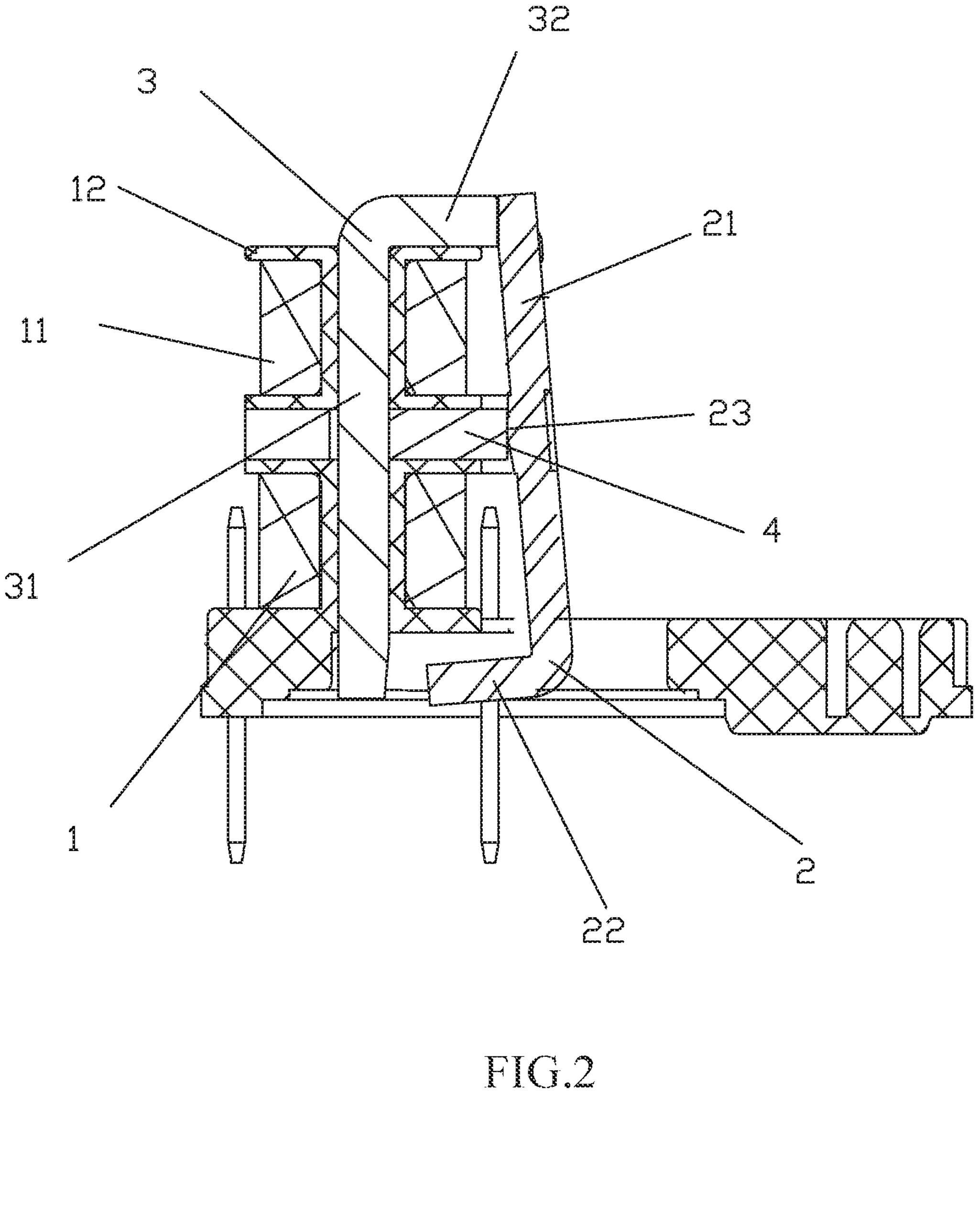
FIG. 2 is a cross-sectional view of the hinge type bistable magnetic circuit structure of the first embodiment of the present disclosure.
Figure 3:
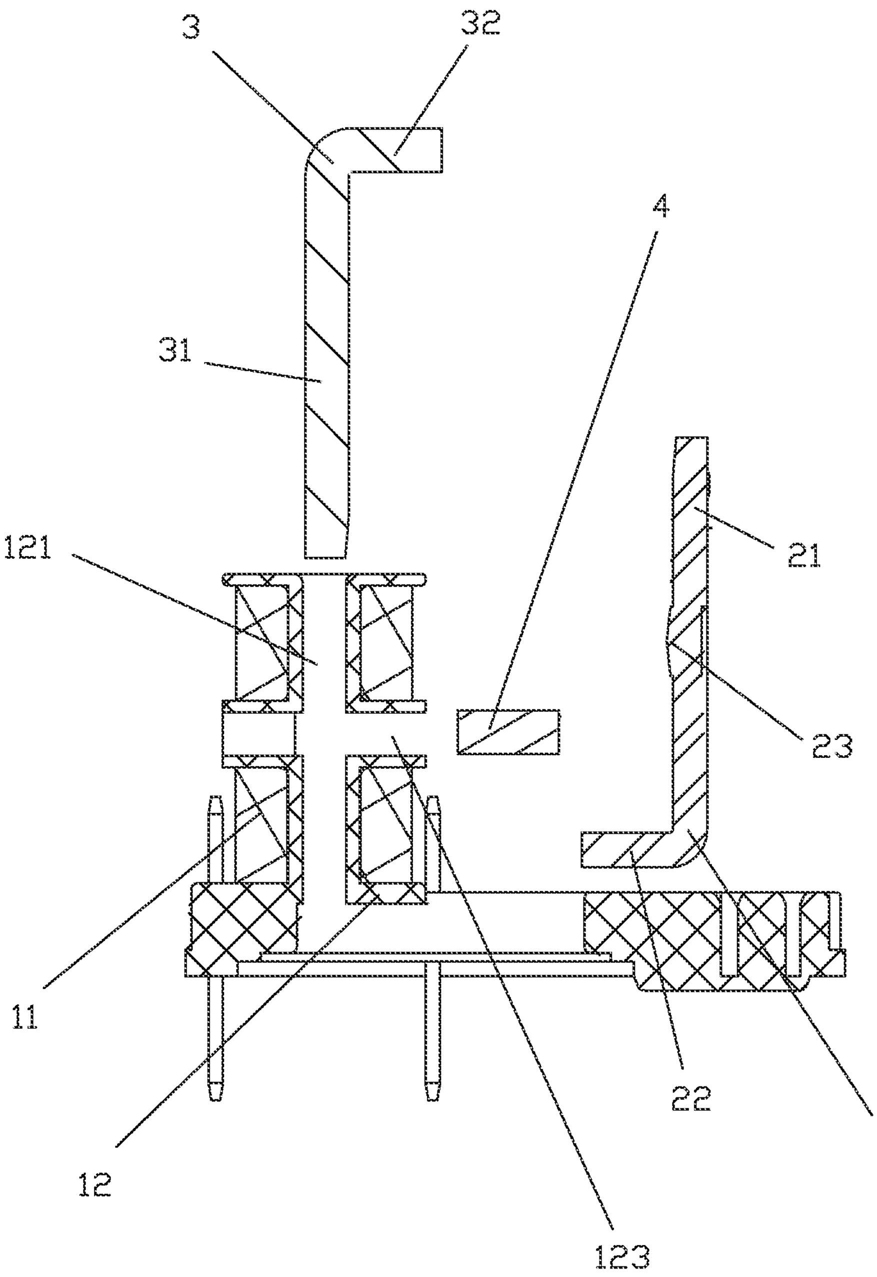
FIG. 3 is a cross-sectional view of the hinge type bistable magnetic circuit structure (the armature, the yoke, the permanent magnet and the coil assembly are in an unassembled state) of the first embodiment of the present disclosure.

The following description of the various exemplary embodiments of the present invention refers to the drawings, which constitute part of the present disclosure and show different exemplary structures, systems and steps implementing various aspects of the present disclosure by way of example. It should be understood that other specific aspects of components, structures, exemplary devices, systems and steps can be used, and structural and functional modifications can be made without departing from the scope of the present disclosure. Moreover, although the terms "upper", "top", "bottom", "between" or the like may be used in this specification to describe various exemplary features and elements of the present disclosure, these terms are used herein only for convenience, for example, the direction according to the example shown in the drawings. Nothing in this specification should be construed as requiring a specific three dimensional orientation of the structure to fall within the scope of the disclosure.

The terms "first", "second" and "third" are only used for description and cannot be understood as indicating or implying relative importance; terms such as "install", "connect with", "connect" and "fix" should be broadly understood. For example, "connect" can be a fixed connection, a detachable connection, or an integral connection; "connect with" can be a direct connection, an indirect connection through an intermediate medium, an electrical connection or a magnetic connection. For those skilled in the art, the specific meanings of the above terms in the embodiments of the present disclosure can be understood according to specific situations.

FIG. 1 shows a schematic diagram of a hinge type bistable magnetic circuit structure in the related art, as shown in FIG. 1, the hinge type bistable magnetic circuit structure includes a bobbin 101, an enameled wire 102, an iron core 103, two yokes 104 and an armature part 105. The enameled wire 102 is wound on the bobbin 101, and the iron core 103 is mounted in the core mounting hole of the bobbin 101, one end of each of the two yokes 104 is fixed to each end of the iron core 103, and the other end of each of the two yokes 104 is used to cooperate with the armature part 105, the armature part 105 is molded by integral injection molding and contains two armatures 106 and a permanent magnet, where, the permanent magnet is located between the two armatures 106 and is encapsulated within the plastic member 107, and two ends of each armature 106 is configured to protrude outside the plastic member 107 to form an integral part with a shape like "工", the other end of each of the two yokes 104 is arranged in and cooperated with the notch on each of the two sides of the integral part with a shape like "工", the middle of the armature part 105 is arranged to be rotatable, and when the armature part 105 is rotated, the armatures 106 protruding from both sides of the armature part 105 is cooperated with the two yokes 104 in a clapper type. This hinge type bistable magnetic circuit structure includes 8 parts in addition to the coil, and in the assembly process, the yoke 104 and the iron core 103 need to be riveted, and the armature part 105 needs to be integrally molded, making the assembly and molding process of the whole magnetic circuit structure more complicated. In addition, in order to ensure that the action and reversion voltages are basically equal and that the movable and stationary contacts of the relay have the same shock resistance in the open and closed states, the magnetic circuit structure should be made into a symmetrical structure, that is, the armature part 105 should be made into a symmetrical structure, and the yoke 104 should also be designed into a symmetrical structure, the symmetrical structure ensures that the force arms are the same when the coils on both sides are electrified during action and reset, so as to ensure that the rotational torques of the two sides rotating around the fulcrum during action and reset are the same, to this end, the disadvantages of complex product structure, more parts, complicated processing technology, high production cost and complicated assembly have been caused.

Figure 4:
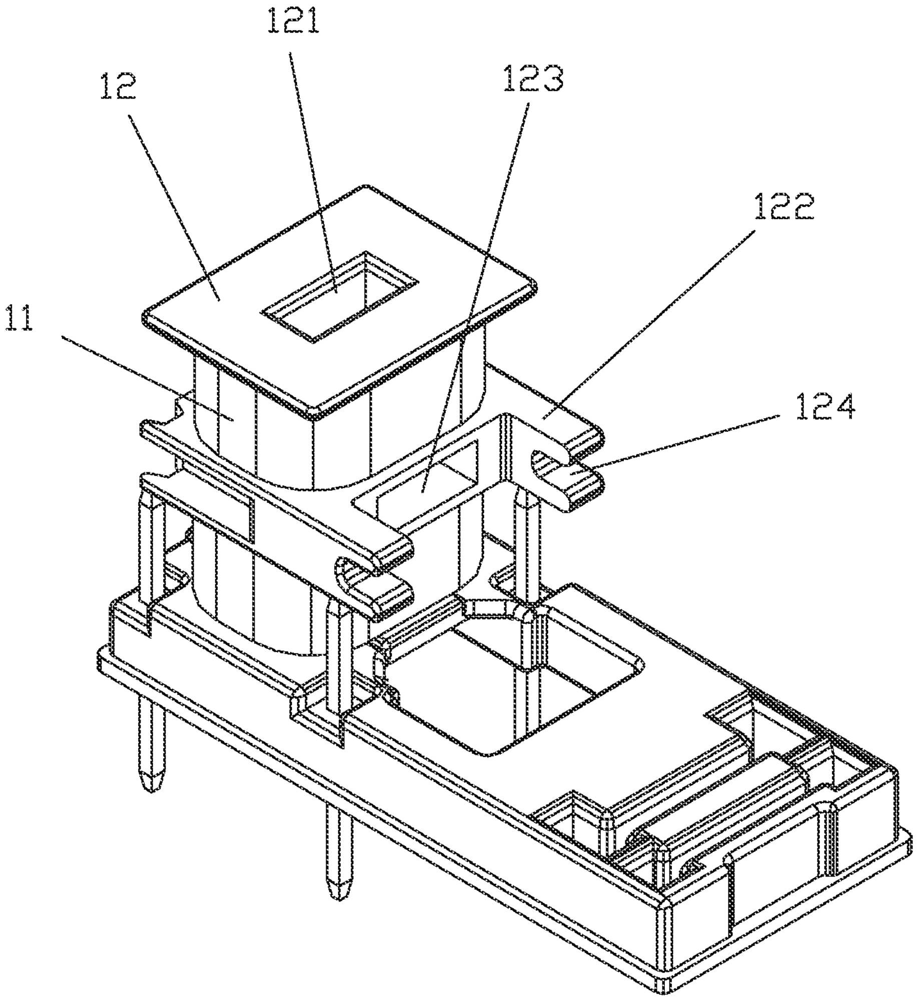
FIG. 4 is a schematic diagram of the structure of the coil assembly of the first embodiment of the present disclosure.
Figure 5:
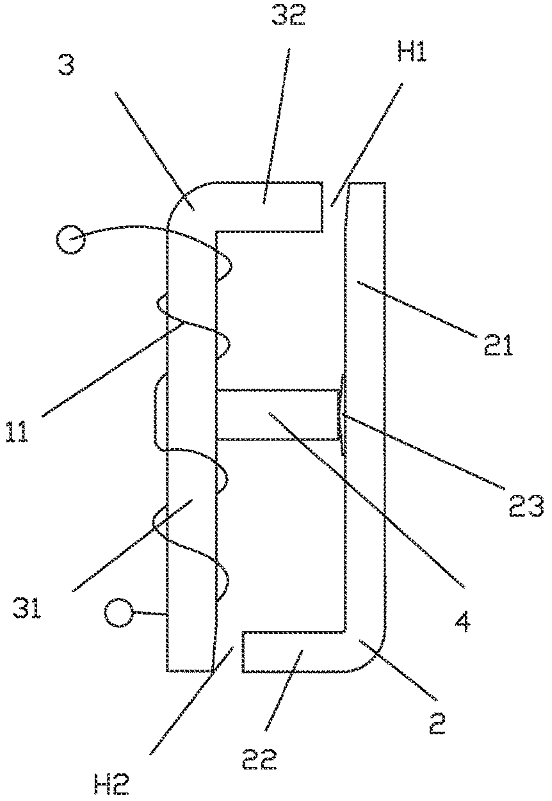
FIG. 5 is a schematic diagram of the design state of the hinge type bistable magnetic circuit structure of first embodiment of the present disclosure.

Referring to FIGS. 2 to 8, a hinge type bistable magnetic circuit structure of the present disclosure includes a coil assembly 1, an L-shaped armature 2, an L-shaped yoke 3 and a permanent magnet 4. The L-shaped yoke 3 includes a first yoke portion 31 and a second yoke portion 32, and the first yoke portion 31 and the second yoke portion 32 form an L shape. Where, the first yoke portion 31 is configured to extend vertically, the second yoke portion 32 of the L-shaped yoke 3 is configured to extend horizontally, and the second yoke portion 32 of the L-shaped yoke 3 is at the upper part. The L-shaped armature 2 is configured on the side of the L-shaped yoke 3 after rotating 180 degrees, i.e., the L-shaped armature 2 is in the state after rotating 180 degrees on the axis of the vertical side of the L shape, and the L-shaped armature 2 and the L-shaped yoke 3 together form a frame-shaped profile. That is, the L-shaped armature 2 includes a first armature portion 21 and a second armature portion 22, the first armature portion 21 is configured to extend vertically, the second armature portion 22 of the L-shaped armature 2 is configured to extend horizontally, and the second armature portion 22 of the L-shaped armature 2 is at the lower part. At the two opposite diagonals of the frame, the junctions of the L-shaped armature 2 and the L-shaped yoke 3 are provided with pre-set first gaps, i.e., the upper gap H1 and the lower gap H2 (as shown in FIG. 5). During operation, the first gap described above can be changed, and the first gap in the operating state can also be called an operating air gap. The coil assembly 1 is arranged at and cooperated with one side of the L shape of the L-shaped yoke 3, i.e., the first yoke portion 31 which is vertically provided, one end of the permanent magnet 4 is connected with the first yoke portion 31 of the L-shaped yoke 3. The first armature portion 21 of the L-shaped armature 2 vertically provided is configured to cooperate with the other end of the permanent magnet 4 so as to be able to perform a seesaw type movement, thereby forming a bistable magnetic circuit between the permanent magnet 4 and the structurally asymmetrical L-shaped armature 2 and L-shaped yoke 3, and realizing the switching between the two stable states of the bistable magnetic circuit by using the excitation of the coil assembly, that is, the two ends of the L-shaped armature 2 realize the clapper type action when the coil 1 assembly is excited. In the design state (as shown in FIG. 5), the L-shaped armature 2 and the L-shaped yoke 3 form a frame-shaped profile, the two opposite diagonals of the frame must be provided with the upper gap H1 and the lower gap H2, so that the L-shaped armature 2 can carry out the seesaw type movement. In the ideal state, since the upper gap H1 and the lower gap H2 are the same, the L-shaped armature 2 is in equilibrium and there are two gaps between the L-shaped armature 2 and the L-shaped yoke 3. However, it is difficult to achieve that the upper gap H1 and the lower gap H2 are the same when assembling. After the L-shaped armature 2 is installed, due to the upper gap H1 and the lower gap H2 are not the same which is caused by the assembly, there will only be a larger gap between the L-shaped armature 2 and the L-shaped yoke 3 (i.e., the sum of the upper gap H1 and the lower gap H2) by the action of the permanent magnet, the other gap originally designed will be disappearing, leaving only one large gap between the L-shaped armature 2 and the L-shaped yoke 3.

In the embodiment, the first armature portion 21 of the L-shaped armature 2 and the first yoke portion 31 of the L-shaped yoke 3 are on two opposite sides of the frame-shaped profile, respectively; one end of the permanent magnet 4 is perpendicular to and is connected with the first yoke portion 31 of the L-shaped yoke 3 in the interior of the frame-shaped profile enclosed by the L-shaped armature and the L-shaped yoke. In the design state (as shown in FIG. 5), the permanent magnet 4 is perpendicular to the first armature portion 21 of the L-shaped armature 2 and the first yoke portion 31 of the L-shaped yoke 3, respectively, and the two end surfaces of the permanent magnet 4 are magnetic pole surfaces. One side of the permanent magnet 4 close to the first yoke portion 31 of the L-shaped yoke 3 is the N pole, and the other side of the permanent magnet 4 close to the first armature portion 21 of the L-shaped armature iron 2 is the S pole (as shown in FIGS. 6 and 7).

In the embodiment, the inner side surface of the tail end of the first armature portion 21 of the L-shaped armature 2 corresponds to the end surface of the second yoke portion 32 of the L-shaped yoke 3, the inner side surface of the tail end of the first yoke portion 31 of the L-shaped yoke 3 corresponds to the end surface of the second armature portion 22 of the L-shaped armature 2.

In the embodiment, the bistable magnetic circuit includes a first magnetic circuit passing through the permanent magnet 4, a section of the first armature portion 21 of the L-shaped armature 2, the second yoke portion 32 of the L-shaped yoke 3, a section of the first yoke portion 31 of the L-shaped yoke 3, and a second magnetic circuit passing through the permanent magnet 4, another section of the first armature portion 21 of the L-shaped armature 2, the second armature portion 22 of the L-shaped armature 2, and another section of the first yoke portion 31 of the L-shaped yoke 3.

Figure 6:
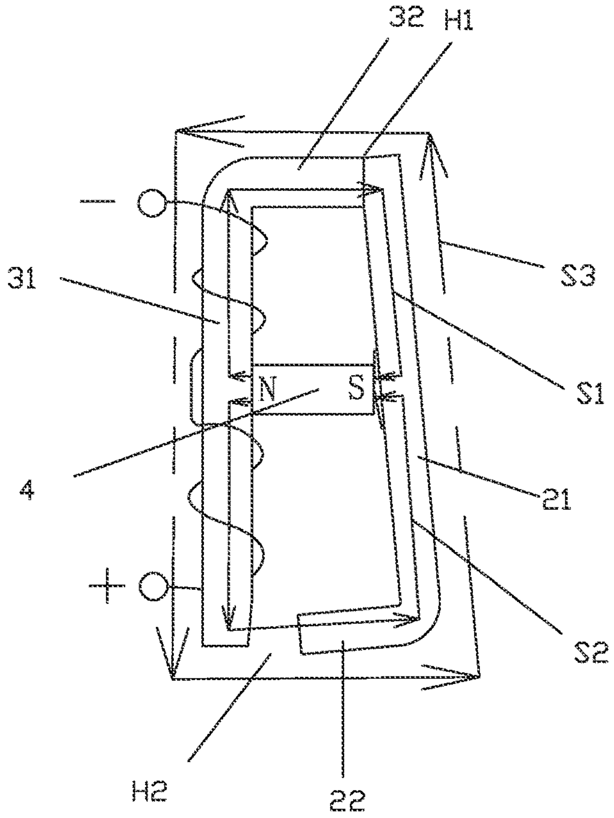
FIG. 6 is a schematic diagram of the magnetic circuit of the hinge type bistable magnetic circuit structure in one state of the first embodiment of the present disclosure.
Figure 7:
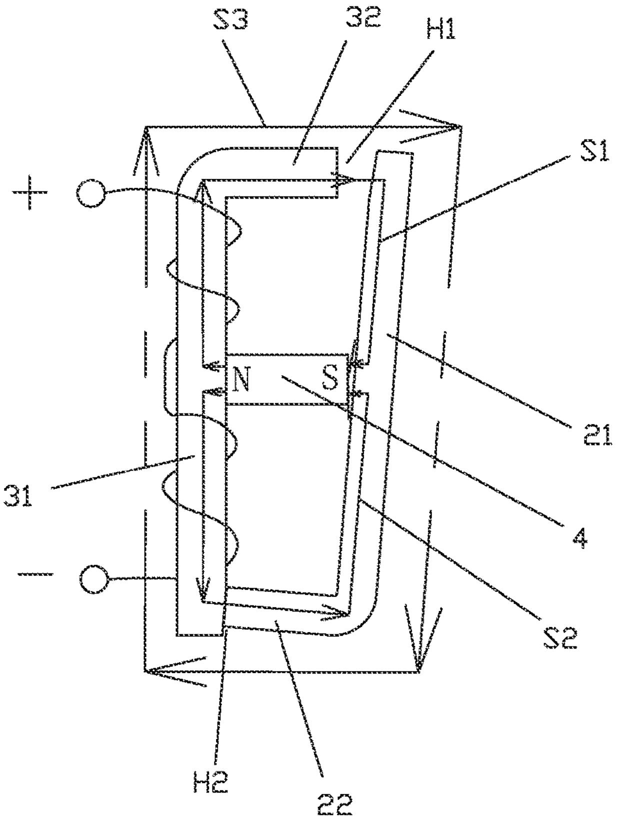
FIG. 7 is a schematic diagram of the magnetic circuit of the hinge type bistable magnetic circuit structure in another state of the first embodiment of the present disclosure.

In the embodiment, in the bistable magnetic circuit, the L-shaped armature 2 is in a stable state when the inner side surface of the tail end of the first armature portion 21 of the L-shaped armature 2 is in contact with the end surface of the second yoke portion 32 of the L-shaped yoke 3 so that the operating air gap at one of the two opposite diagonals of the frame-shaped profile is smaller than the operating air gap at the other one of the two opposite diagonals (the upper gap H1 is smaller than the lower gap H2 as shown in FIG. 6). The L-shaped armature 2 is in another stable state when the inner side surface of the tail end of the first yoke portion 31 of the L-shaped yoke 3 is in contact with the end surface of the second armature portion 22 of the L-shaped armature 2 so that the operating air gap at the other one of the two opposite diagonals of the frame-shaped frame is smaller than the operating air gap at the one of the two opposite diagonals (the lower gap H2 is smaller than the upper gap H1 as shown in FIG. 7). The inner side surface of the tail end of the first armature portion 21 of the L-shaped armature 2 and the end surface of the second yoke portion 32 of the L-shaped yoke 3 are mutually cooperated operating pole surfaces, as shown in FIGS. 5 and 6, In the embodiment, the inner side surface of the tail end of the first armature portion 21 of the L-shaped armature 2 is provided with an inclined surface to achieve a coincident fit with the end surface of the second yoke portion 32 of the L-shaped yoke 3, of course, it is also possible to set the end surface of the second yoke portion 32 of the L-shaped yoke 3 to be an inclined surface. Similarly, the inner side surface of the tail end of the first yoke portion 31 of the L-shaped yoke 3 and the end surface of the second armature portion 22 of the L-shaped armature 2 are also operating pole surfaces cooperated with each other, one of which is provided with an inclined surface to facilitate the cooperating.

In the embodiment, the permanent magnet 4 is located between the middle portion of the first yoke portion 31 of the L-shaped yoke 3 and the middle portion of the first armature portion 21 of the L-shaped armature 2.

In the embodiment, the length of one side of the L shape of the L-shaped armature 2 (the first armature portion 21) is greater than the length of the other side of the L shape of the L-shaped armature 2 (the second armature 22), as shown in FIG. 5, the length of the first armature portion 21 in the vertical direction is larger than the length of the second armature portion 22 in the horizontal direction. The length of one side of the L shape of the L-shaped yoke 3 (the first yoke portion 31) is greater than the length of the other side of the L shape of the L-shaped yoke 3 (the second yoke portion 32), as shown in FIG. 5, the length of the first yoke portion 31 in the vertical direction is larger than the length of the second yoke portion 32 in the horizontal direction.

In the embodiment, the coil assembly 1 includes a bobbin 12 and an enameled wire 11 wound in the winding window of the bobbin 12, the first yoke portion 31 of the L-shaped yoke 3 is inserted in the core mounting hole 121 of the bobbin 12, the bobbin 12 is provided with a permanent magnet mounting hole 123 in the middle of the winding window facing the first armature portion 21 of the L-shaped armature 2, the permanent magnet mounting hole 123 is communicated with the core mounting hole 121, and the permanent magnet 4 is fitted in the permanent magnet mounting hole 123 of the bobbin 12.

In the embodiment, the first armature portion 21 of the L-shaped armature 2 uses the other end of the permanent magnet 4 as a rotational support point, so that the first armature portion 21 can swing to cooperate with the L-shaped yoke 3, thereby achieving a seesaw type movement.

In the embodiment, as shown in FIG. 5, the inner side surface of the first armature portion 21 of the L-shaped armature 2 is provided with a projecting second projection 23, and the second projection 23 is integrally formed with the first armature portion 21, the second projection 23 of the first armature portion 21 of the L-shaped armature 2 is configured to abut against the end surface of the other end of the permanent magnet 4, so that the first armature portion 21 of the L-shaped armature 2 uses the other end of the permanent magnet 4 as a rotational support point to be capable of swinging to cooperate with the L-shaped yoke 3.

Figure 8:
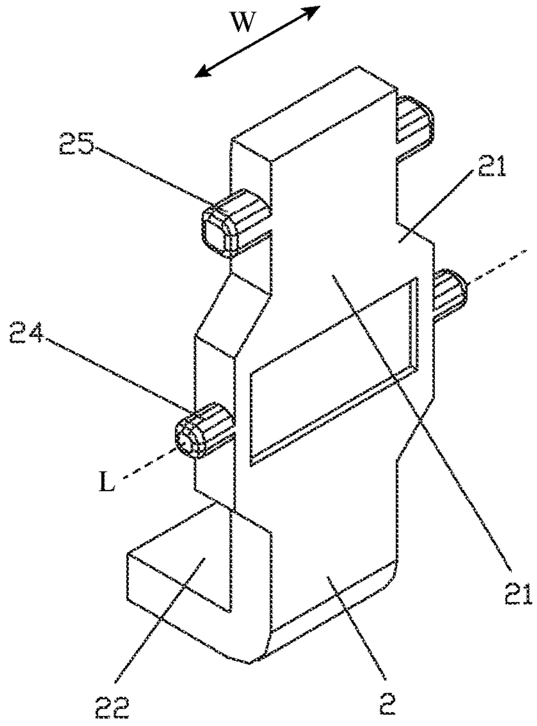
FIG. 8 is a perspective schematic view of the L-shaped armature of the first embodiment of the present disclosure.

In the embodiment, as shown in FIG. 8, a limit rotation shaft 24 is provided on each side of the first armature portion 21 of the L-shaped armature 2 in the width direction W, the limit rotation shaft 24 is used to limit the L-shaped armature 2, and the center line L of the limit rotation shaft 24 vertically intersects with the connecting line or the extension line of the connecting line from one end to the other end of the permanent magnet 4 and passing through the rotational support point. As shown in FIG. 4, the bobbin 12 is provided with a fourth projection 122 extending toward the first armature portion 21 of the L-shaped armature 2, the fourth projection 122 is provided with a groove 124 adapted to the limit rotation shaft 24 of the first armature portion 21 of the L-shaped armature 2, the limit rotation shaft 24 of the L-shaped armature 2 is rotatably fitted in the groove 124 of the fourth projection 122 of the bobbin 12. The best effect is that the center line L of the limit rotation shaft 24 coincides with the rotational support point.

In the embodiment, the groove 124 of the fourth projection 122 of the bobbin 12 is in arc contact with and cooperates with the limit rotation shaft 24 of the L-shaped armature 2.

In the embodiment, the limit rotation shaft 24 of the L-shaped armature 2 is a fifth projection integrally formed on both sides in the width direction W of the first armature portion 21 of the L-shaped armature 2.

Referring to FIG. 6, the magnetic circuit structure is in a state, when the enameled wire of the coil assembly 1 is not energized and excited, the permanent magnet 4 forms two parallel magnetic circuits by a permanent magnet magnetic circuit S1 and a permanent magnet magnetic circuit S2, where the upper operating air gap of the permanent magnet magnetic circuit S1 is smaller than the lower operating air gap of the permanent magnet magnetic circuit S2, the magnetic resistance of the permanent magnet magnetic circuit S1 is the smallest and the magnetic flux is the largest, so the armature 2 remains in the state as shown in FIG. 6. When it is necessary to switch to another state, an excitation in one direction is applied to the coil assembly 1. The magnetic flux of the coil magnetic circuit S3 is superimposed with the magnetic flux of the permanent magnet magnetic circuit S2 in the lower operating air gap, and is weakened with the permanent magnet magnetic circuit S1. When the magnetic flux in the lower operating air gap is greater than the magnetic flux in the upper operating air gap, the armature 2 switches to the state as shown in FIG. 7, after the excitation applied to the coil assembly 1 is removed, the permanent magnet magnetic circuit S2 has the minimum magnetic resistance and the maximum magnetic flux, and the armature 2 remains in the state as shown in FIG. 7. When it is necessary to switch back to the state shown in FIG. 6, an excitation in the opposite direction is applied to the coil assembly 1, The magnetic flux of the coil magnetic circuit S3 is superimposed with the magnetic flux of the permanent magnet magnetic circuit S1 in the upper operating air gap, and is weakened with the permanent magnet magnetic circuit S2. When the magnetic flux in the upper operating air gap is greater than the magnetic flux in the lower operating air gap, the armature 2 switches to the state as shown in FIG. 6, after the excitation applied to the coil assembly 1 is removed, the permanent magnet magnetic circuit S1 has the minimum magnetic resistance and the maximum magnetic flux, and the armature 2 remains in the state as shown in FIG. 6.

Figure 9:
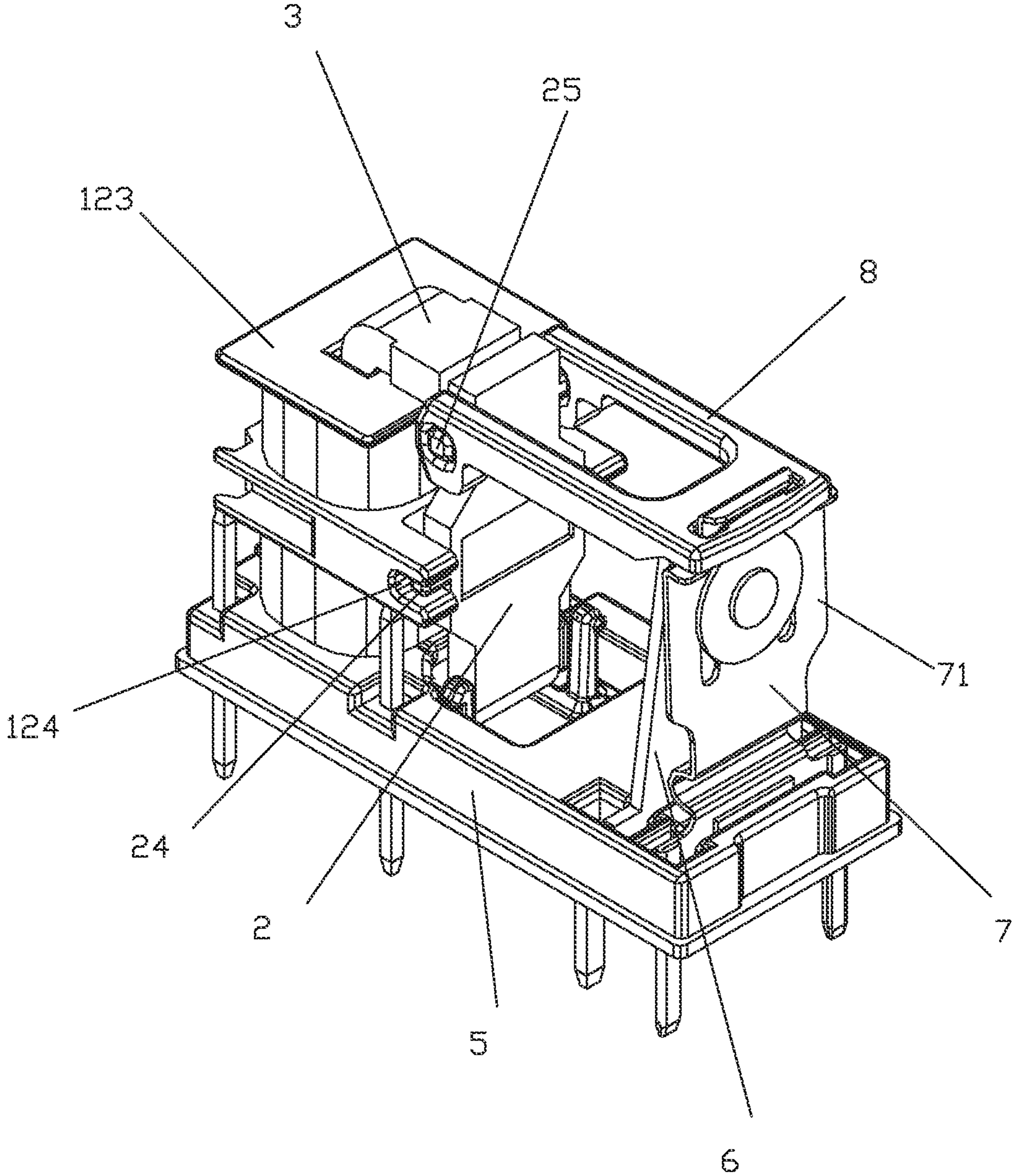
FIG. 9 is a perspective schematic view of the magnetic latching relay (without housing) of the first embodiment of the present disclosure.
Figure 10:
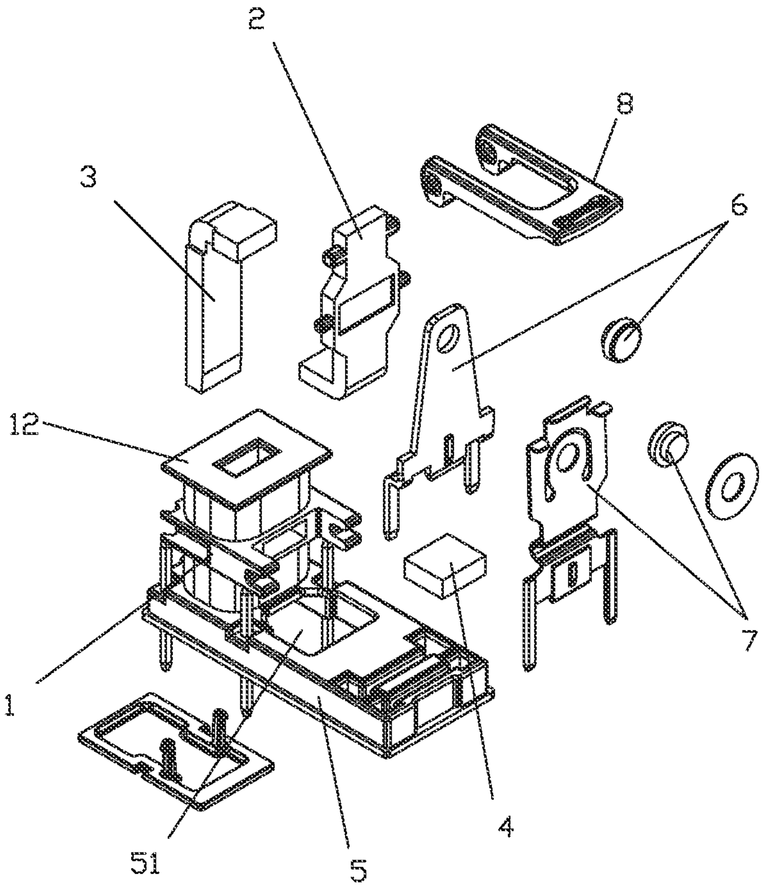
FIG. 10 is an exploded perspective schematic diagram of the magnetic latching relay of the first embodiment of the present disclosure.
Figure 11:
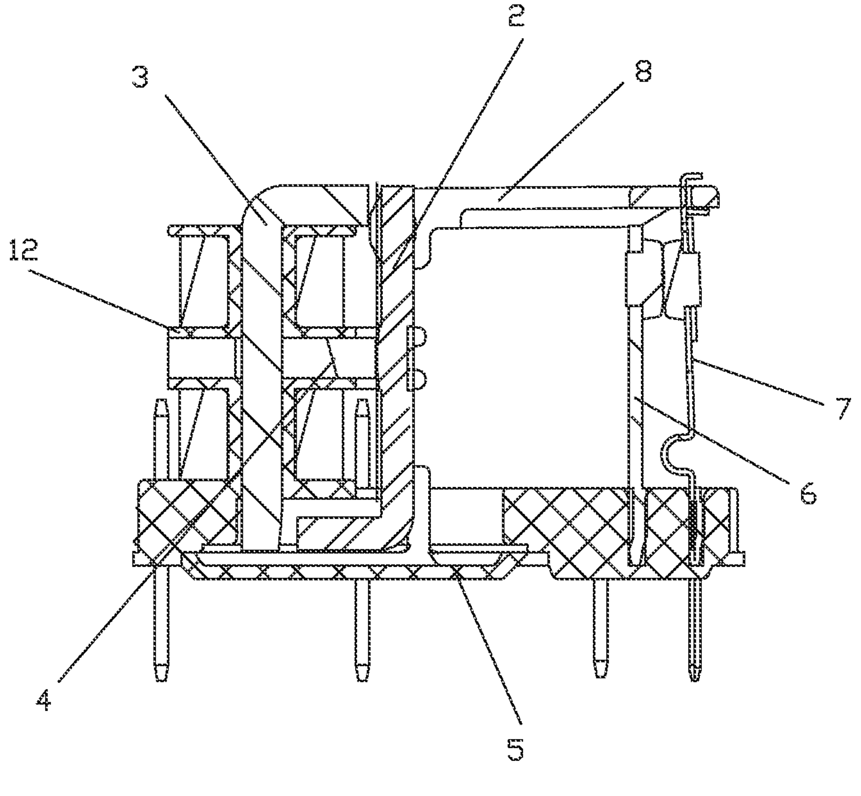
FIG. 11 is a cross-sectional view of the structure of the magnetic latching relay of the first embodiment of the present disclosure.

Referring to FIGS. 2 to 11, a magnetic latching relay of the present disclosure, includes a base 5, a stationary spring part 6, a movable spring part 7, a pushing card 8 and the hinge type bistable magnetic circuit structure described above, the hinge type bistable magnetic circuit structure, the stationary spring part 6 and the movable spring part 7 are mounted on the base 5 respectively. The pushing card 8 is connected between the first armature portion 21 of the L-shaped armature 2 of the hinge type bistable magnetic circuit structure and the movable spring of the movable spring part 7. Where, as shown in FIG. 10, the base 5 and the bobbin 12 are one-piece injection molded parts, and the base 5 is provided with a through hole 51 to facilitate the installation of the L-shaped armature 2. As shown in FIG. 9, the pushing card 8 is connected between the first armature portion 21 of the L-shaped armature 2 and the movable spring 71 of the movable spring part 7, a seventh projection 25 is provided on both sides of the first armature portion 21 of the L-shaped armature 2 in the width direction W, the seventh projection 25 is positioned above the limit rotation shaft 24, and the seventh projection 25 of the L-shaped armature 2 is used to cooperate with the pushing card 8, thereby driving the pushing card 8 to have an action. During assembly, the first yoke portion 31 of the L-shaped yoke 3 is inserted directly into the core mounting hole 121 of the bobbin 12 from above to below, the permanent magnet 4 can also be inserted directly into the permanent magnet mounting hole 123 of the bobbin 12, the L-shaped armature 2 can be installed directly into the base 5 and the bobbin 12 from the above to below, the assembly does not require the yoke and iron core to be riveted and the armature portion to be integrally molded, as in related art.

A hinge type bistable magnetic circuit structure and a magnetic latching relay of the present disclosure, a coil assembly 1, an L-shaped armature 2, an L-shaped yoke 3 and a permanent magnet 4 are adopted to form a hinge type magnetic circuit structure, there are only three parts other than the coil assembly 1, and the assembly of the three parts is quite convenient, there is no need to rivet the yoke and iron core as in the related art, and there is no need to mold the armature as a whole as in the related art, especially, due to the asymmetry of parts structure, parts processing is simpler, which not only reduces the number of parts, but also reduces the processing procedures, and has the characteristics of simple product structure and processing technology, low manufacturing cost and convenient assembly.

Second Embodiment

Figure 12:
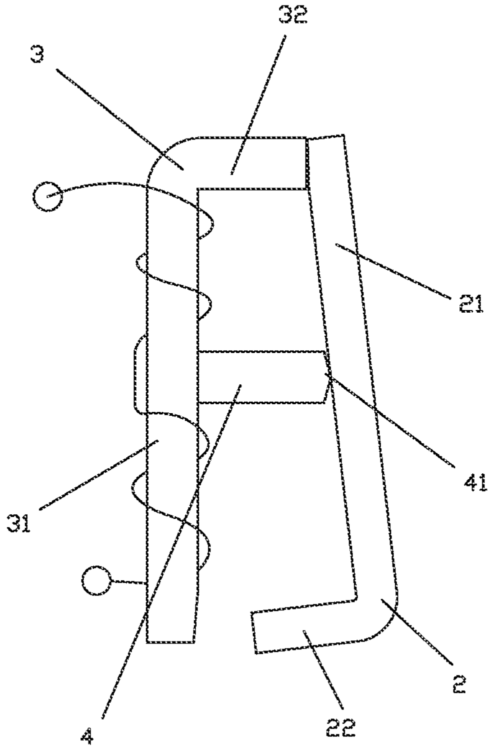
FIG. 12 is a simple schematic diagram of the hinge type bistable magnetic circuit structure of the second embodiment of the present disclosure.

Referring to FIG. 12, a hinge type bistable magnetic circuit structure and a magnetic latching relay of the present disclosure, the difference from the first embodiment is that instead of the second projection on the inner side surface of the first armature portion 21 of the L-shaped armature 2, a projecting first projection 41 is provided on the end surface of the other end of the permanent magnet 4, the first projection 41 is integrally formed with the permanent magnet 4, the first projection 41 of the permanent magnet 4 is abutted against the inner side surface of the first armature portion 21 of the L-shaped armature 2, so that the first armature portion 21 of the L-shaped armature 2 uses the other end of the permanent magnet 4 as a rotational support point to be capable of swinging to cooperate with the L-shaped yoke 3.

Third Embodiment

Figure 13:
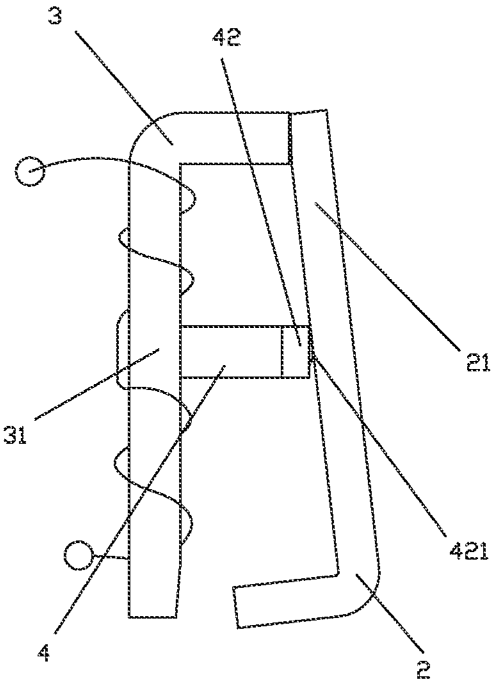
FIG. 13 is a simple schematic diagram of the hinge type bistable magnetic circuit structure of the third embodiment of the present disclosure.

Referring to FIG. 13, a hinge type bistable magnetic circuit structure and a magnetic latching relay of the present disclosure, the difference from the first embodiment is that there is no second projection on the inner side surface of the first armature portion 21 of the L-shaped armature 2, a magnetic conductor 42 is further provided between the other end of the permanent magnet 4 and the first armature portion 21 of the L-shaped armature 2, one end of the magnetic conductor 42 connected with the first armature portion 21 of the L-shaped armature 2 is provided with a projecting third projection 421, the third projection 421 is integrally formed with the magnetic conductor 42, so that the first armature portion 21 of the L-shaped armature 2 uses the corresponding end of the magnetic conductor 42 as a rotational support point to be capable of swinging to cooperate with the L-shaped yoke 3.

Fourth Embodiment

Figure 14:
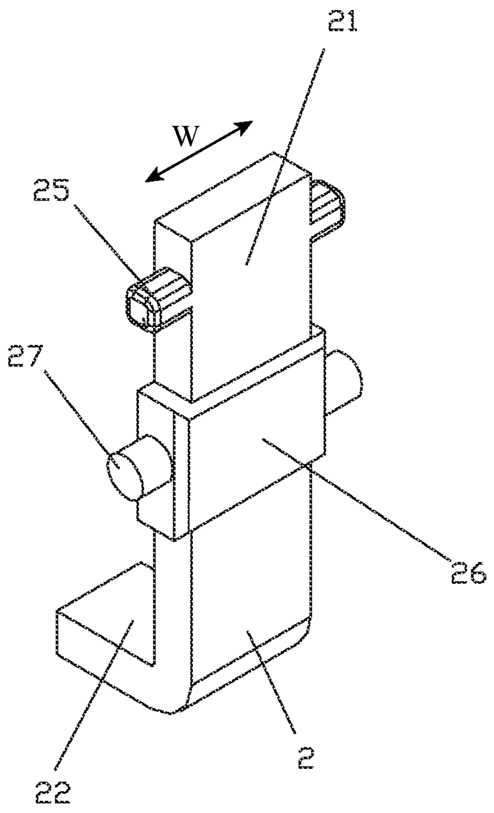
FIG. 14 is a perspective schematic view of the L-shaped armature of the fourth embodiment of the present disclosure.

Referring to FIG. 14, a hinge type bistable magnetic circuit structure and a magnetic latching relay of the present disclosure, the difference from the first embodiment is that the first armature 21 of the L-shaped armature 2 is partially covered with a plastic member 26, the limit rotation shaft 24 of the L-shaped armature 2 is a sixth projection 27 integrally molded on the plastic member 26 on both sides in the width direction W of the first armature portion 21 of the L-shaped armature 2.

Fifth Embodiment

Figure 15:
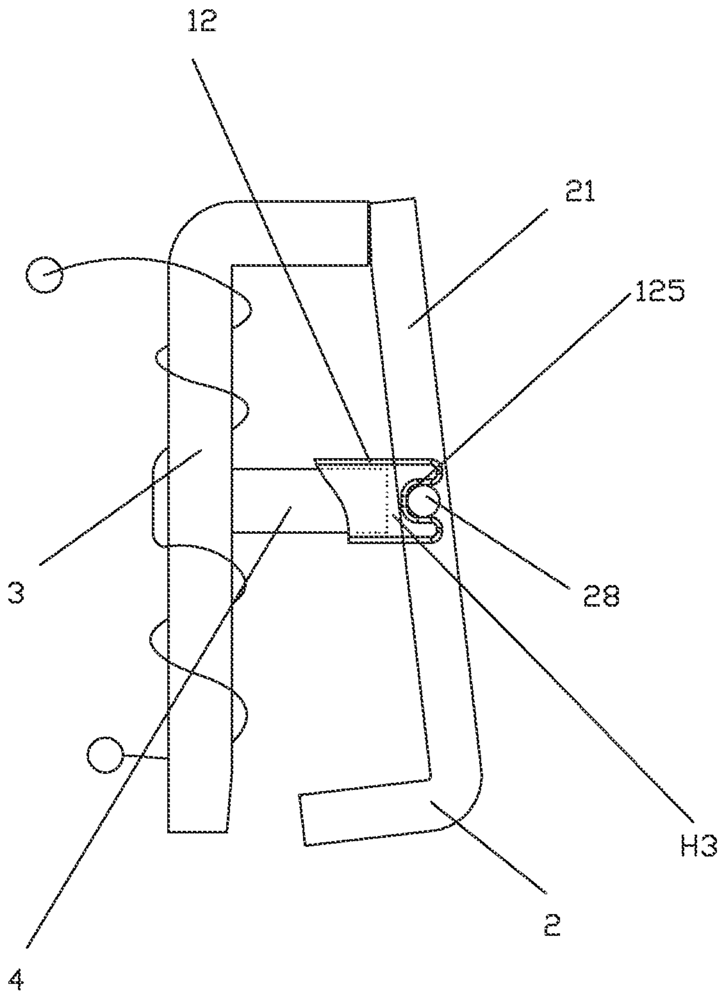
FIG. 15 is a simple schematic diagram of the hinge type bistable magnetic circuit structure of the fifth embodiment of the present disclosure.

Referring to FIG. 15, a hinge type bistable magnetic circuit structure and a magnetic latching relay of the present disclosure, the difference from the first embodiment is that a pre-set second gap H3 is provided between the first armature portion 21 of the L-shaped armature 2 and the other end of the permanent magnet 4. A rotation shaft 28 is provided at each of the both sides of the L-shaped armature 2 in the width direction W and corresponds to an extension line of the connecting line from one end to the other end of the permanent magnet 4, so as to use the rotation shaft 28 to achieve a seesaw movement of the L-shaped armature 2. The bobbin 12 is provided with a support 125 for supporting the rotation shaft 28 of the L-shaped armature 2, the support 125 is a semi-enclosed sleeve in the embodiment.

In the embodiment, the rotation shaft 28 is directly arranged on the L-shaped armature 2, or a part of the first armature 21 of the L-shaped armature 2 is covered with a plastic member from which the rotation shaft 28 is integrally molded.

Sixth Embodiment

Referring to FIGS. 16 to 21, a hinge type bistable magnetic circuit structure and a magnetic latching relay of the present disclosure, the difference from the first embodiment is that a pressure spring 9 is also connected to the first armature portion 21 of the L-shaped armature 2, and the first armature portion 21 of the L-shaped armature 2 is connected to the bobbin 12 through the pressure spring 9. That is, in the embodiment, the position of the L-shaped armature 2 is limited by using the pressure spring 9 instead of the limit rotation shaft.

Figure 18:
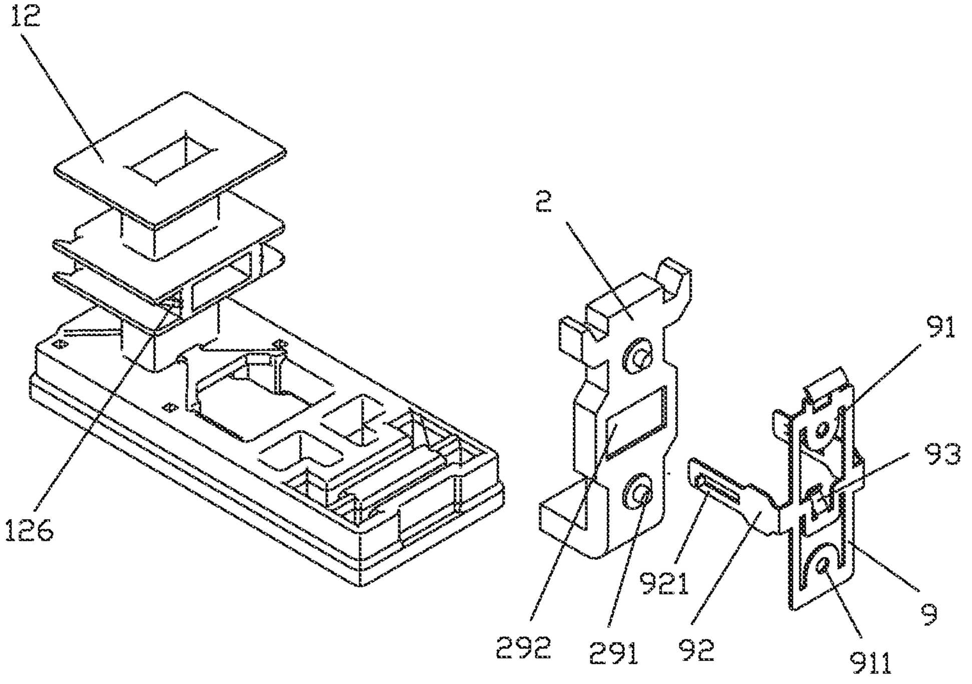
FIG. 18 is an exploded perspective schematic diagram of the hinge type bistable magnetic circuit structure of the sixth embodiment of the present disclosure.

In the embodiment, as shown in FIG. 18, the pressure spring 9 includes a main piece 91 and wings 92 bent from two side edges of the main piece 91 and protruded from one side surface, a side surface of the first armature portion 21 of the L-shaped armature 2 facing away from the first yoke portion 31 of the L-shaped yoke 3 is provided with a convex part 291 protruding outward, as shown in the FIG. 18, there are two convex parts 291. The main piece 91 is provided with a first snap-fit hole 911, as shown in the FIG. 18, there are two first snap-fit holes 911, the first snap-fit hole 911 of the main piece 91 is correspondingly fitted with the convex part 291 of the first armature portion 21 of the L-shaped armature 2. The wing 92 of the pressure spring 9 extends to the bobbin 12 and is connected with the bobbin 12. The main piece 91 of the pressure spring 9 is flexible, so as to ensure that the first armature portion 21 of the L-shaped armature 2 can perform a seesaw movement after the pressure spring 9 is connected with the first armature portion 21 of the L-shaped armature 2.

In the embodiment, as shown in FIG. 18, the wing 92 of the pressure spring 9 is provided with a second snap-fit hole 921, a block 126 is provided at the corresponding position of the bobbin 12, the second snap-fit hole 921 of the wing 92 of the pressure spring 9 is stuckly fitted with the block 126 of the bobbin 12.

Figure 16:
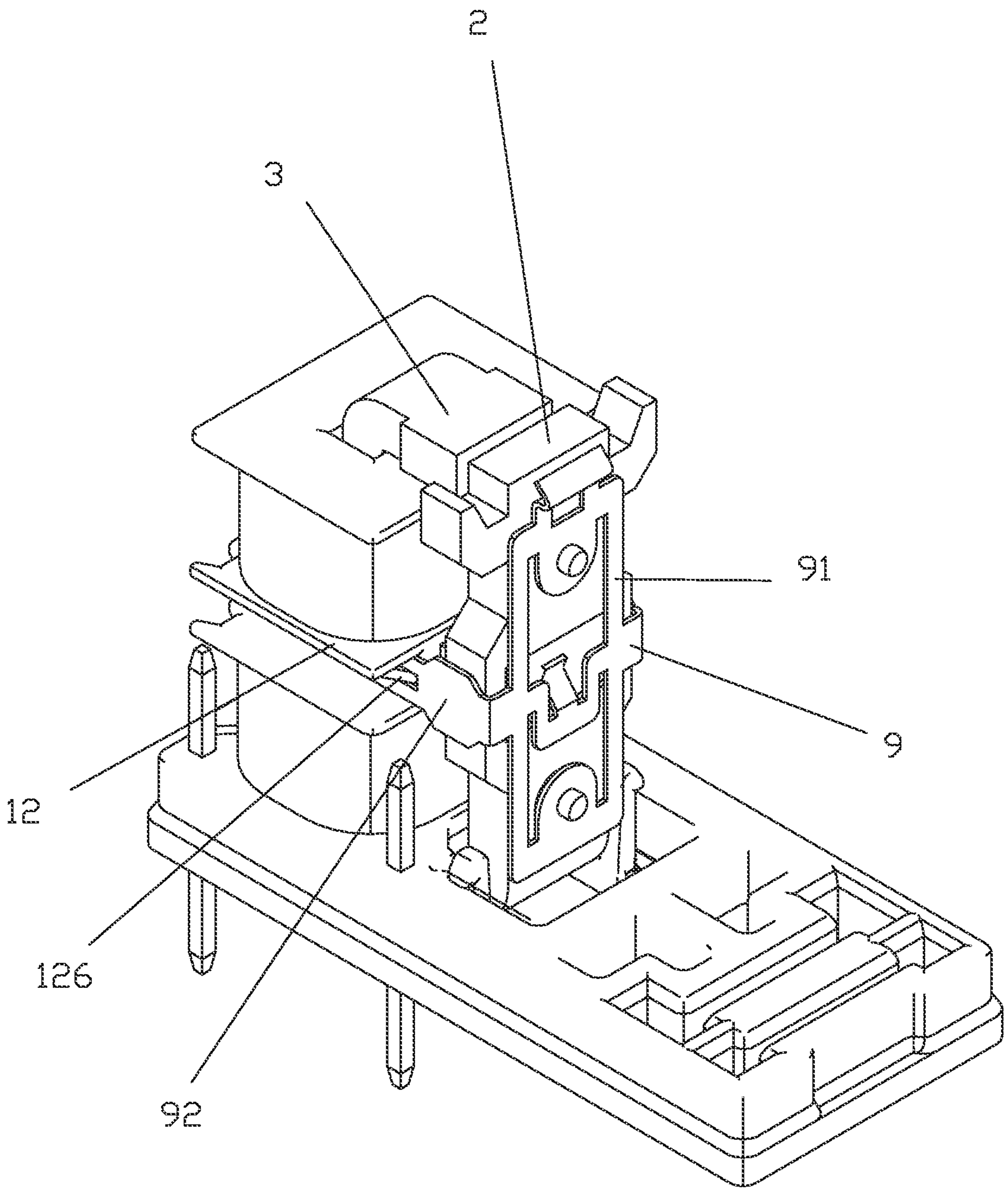
FIG. 16 is a perspective schematic view of the hinge type bistable magnetic circuit structure of the sixth embodiment of the present disclosure.
Figure 17:
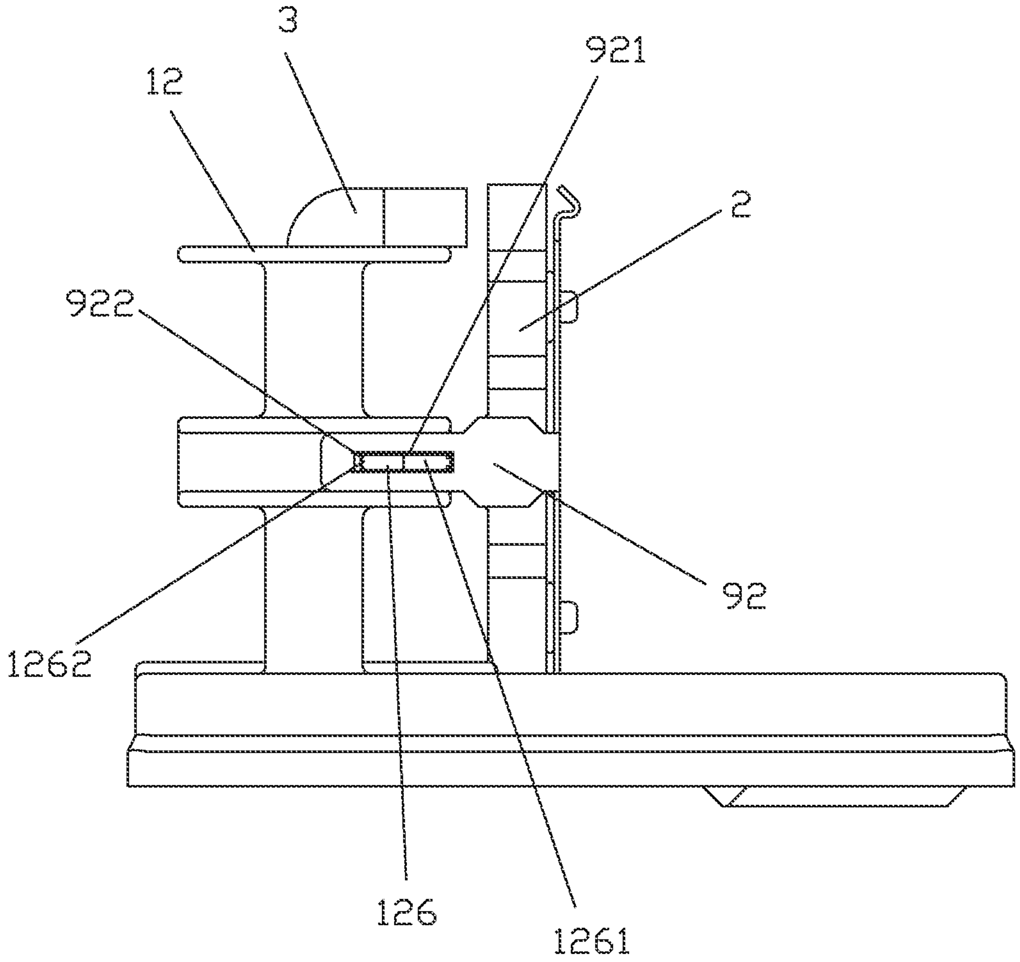
FIG. 17 is a side view of the hinge type bistable magnetic circuit structure of the sixth embodiment of the present disclosure.
Figure 19:
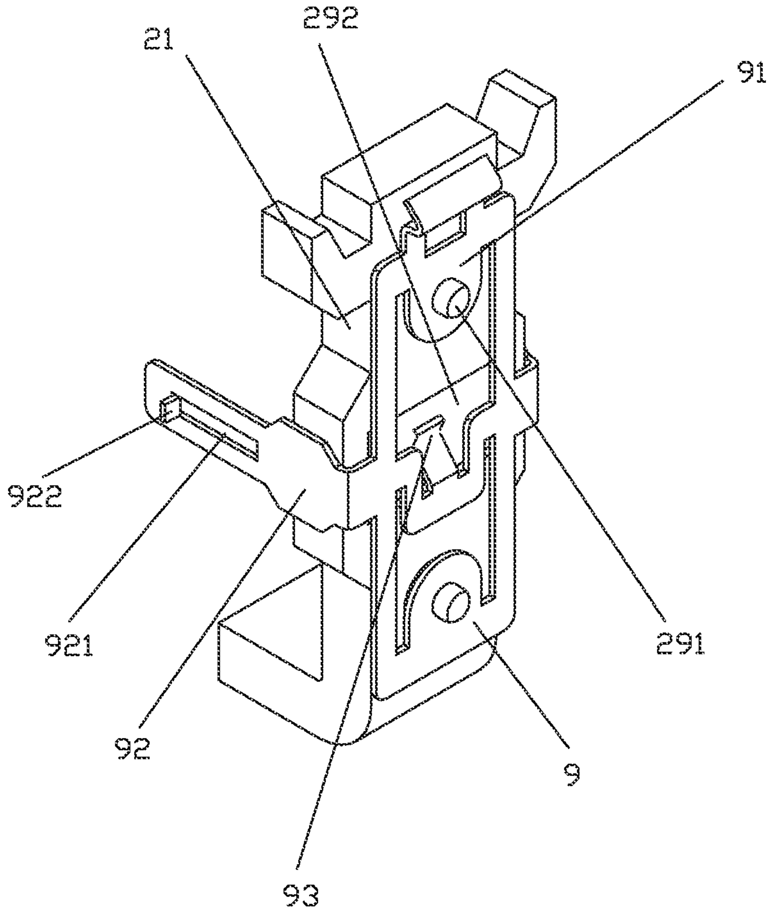
FIG. 19 is a schematic diagram showing the assembly of the pressure spring and the L-shaped armature of the hinge type bistable magnetic circuit structure of the sixth embodiment of the present disclosure.
Figure 20:
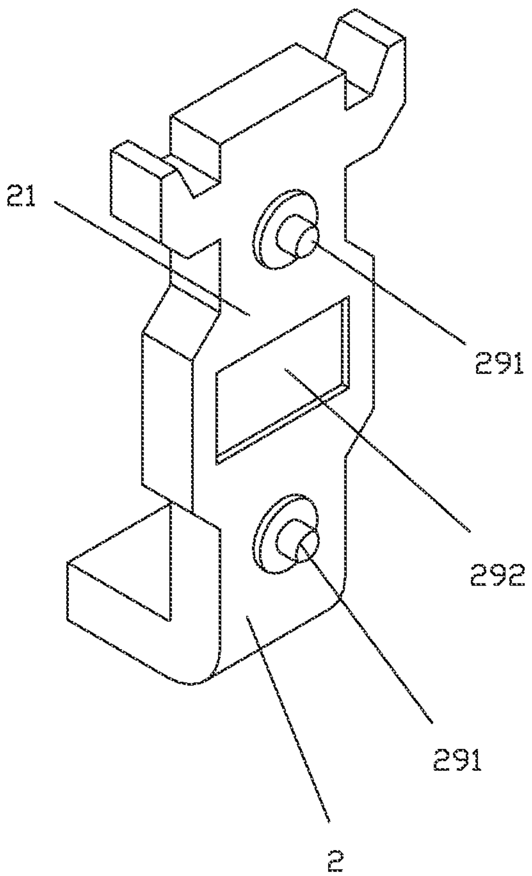
FIG. 20 is a perspective schematic view of the L-shaped armature of the hinge type bistable magnetic circuit structure of the sixth embodiment of the present disclosure.
Figure 21:
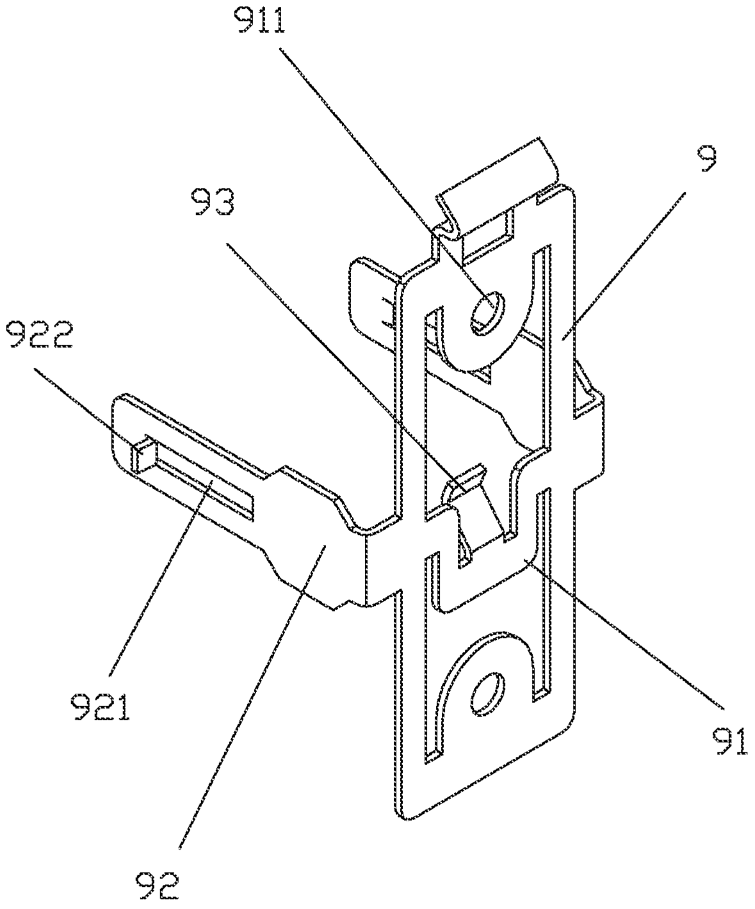
FIG. 21 is a perspective schematic view of the pressure spring of the hinge type bistable magnetic circuit structure of the sixth embodiment of the present disclosure.

In the embodiment, as shown in FIG. 19, the second snap-fit hole 921 of the wing 921 of the pressure spring 9 is elongated, one side of the second snap-fit hole 921 is provided with a clamping piece 922. As shown in FIGS. 16 and 17, the block 126 is provided with an inclined surface 1261 on the side facing the main piece 91 of the pressure spring 9, and the block 126 is also provided with a straight surface 1262 on the side facing away from the main piece 91 of the pressure spring 9. The clamping piece 922 of the second snap-fit hole 921 is fitted with the straight surface 1262 of the block 126.

In the embodiment, as shown in FIG. 18, the first armature portion 21 of the L-shaped armature 2 is provided with a concave portion 292 on the side facing away from the first yoke portion 31 of the L-shaped yoke 3, the pressure spring 9 is provided with an elastic tongue 93 corresponding to the concave portion 292, the elastic tongue 93 of the pressure spring 9 abuts against the concave portion 292 of the first armature portion 21 of the L-shaped armature 2.

The contents described above are only example embodiments of the present disclosure and are not intended to limit the present disclosure in any way. Although the present disclosure has been disclosed as described above in example embodiments, it is not intended to limit the present disclosure. Any person skilled in the art can make many possible variations and modifications to the technical solutions of this disclosure, or modify them to equivalent embodiments of equivalent assimilation, using the technical content revealed above, without departing from the scope of the technical solutions of this disclosure. Therefore, any simple modifications, equivalent changes and modifications made to the above embodiments based on the technical substance of the present disclosure without departing from the content of the technical solutions of the present disclosure shall fall within the scope of protection of the technical solutions of the present disclosure.

What is claimed is:

1. A hinge type bistable magnetic circuit structure, comprising:

a coil assembly, an L-shaped armature, an L-shaped yoke, and a permanent magnet, wherein;

the L-shaped armature is configured on a side of the L-shaped yoke, and the L-shaped armature and the L-shaped yoke together form a frame;

at two opposite diagonals of the frame, a junction of the L-shaped armature and the L-shaped yoke is provided with a pre-set first gap;

the L-shaped yoke comprises a first yoke portion and a second yoke portion which are together formed an L shape, the coil assembly is arranged at and cooperated with the first yoke portion, and one end of the permanent magnet is connected with the first yoke portion of the L-shaped yoke; and the L-shaped armature comprises a first armature portion and a second armature portion which are together formed an L shape, the first armature portion of the L-shaped armature is configured to cooperate with the other end of the permanent magnet so as to be able to perform a seesaw type movement, thereby forming a bistable magnetic circuit between the permanent magnet and the structurally asymmetrical L-shaped armature and the L-shaped yoke, and realizing a switching between two stable states of the bistable magnetic circuit by using an excitation of the coil assembly; and the coil assembly comprises a bobbin and an enameled wire wound in a winding window of the bobbin, the first yoke portion of the L-shaped yoke is inserted in a core mounting hole of the bobbin, in the middle of the winding window, the bobbin is provided with a permanent magnet mounting hole facing the first armature portion of the L-shaped armature, the permanent magnet mounting hole is communicated with the core mounting hole, and the permanent magnet is fitted in the permanent magnet mounting hole of the bobbin.

2. The hinge type bistable magnetic circuit structure according to claim 1, wherein the first armature portion of the L-shaped armature and the first yoke portion of the L-shaped yoke are on two opposite sides of the frame; one end of the permanent magnet is perpendicular to and is connected with the first yoke portion of the L-shaped yoke in an interior of the frame enclosed by the L-shaped armature and the L-shaped yoke; and two end surfaces of the permanent magnet are magnetic pole surfaces.

3. The hinge type bistable magnetic circuit structure according to claim 2, wherein an inner side surface of a tail end of the first armature portion of the L-shaped armature is configured to correspond to an end surface of the second yoke portion of the L-shaped yoke, and an inner side surface of a tail end of the first yoke portion of the L-shaped yoke is configured to correspond to an end surface of the second armature portion of the L-shaped armature.

4. The hinge type bistable magnetic circuit structure according to the claim 3, wherein the bistable magnetic circuit comprises a first magnetic circuit passing through the permanent magnet, a section of the first armature portion of the L-shaped armature, the second yoke portion of the L-shaped yoke, a section of the first yoke portion of the L-shaped yoke, and a second magnetic circuit passing through the permanent magnet, another section of the first armature portion of the L-shaped armature, the second armature portion of the L-shaped armature, and another section of the first yoke portion of the L-shaped yoke.

5. The hinge type bistable magnetic circuit structure according to the claim 4, wherein;

in the bistable magnetic circuit, the L-shaped armature is in a stable state when the inner side surface of the tail end of the first armature portion of the L-shaped armature is in contact with the end surface of the second yoke portion of the L-shaped yoke so that a first gap at one of the two opposite diagonals of the frame is smaller than a first gap at the other one of the two opposite diagonals; and the L-shaped armature is in another stable state when the inner side surface of the tail end of the first yoke portion of the L-shaped yoke is in contact with the end surface of the second armature portion of the L-shaped armature so that the first gap at the other one of the two opposite diagonals of the frame is smaller than the first gap at the one of the two opposite diagonals.

6. The hinge type bistable magnetic circuit structure according to claim 2, wherein the permanent magnet is located between the middle of the first yoke portion of the L-shaped yoke and the middle of the first armature portion of the L-shaped armature.

7. The hinge type bistable magnetic circuit structure according to claim 6, wherein a length of the first armature portion of the L-shaped armature is greater than a length of the second armature portion of the L-shaped armature; and a length of the first yoke portion of the L-shaped yoke is greater than a length of the second yoke portion of the L-shaped yoke.

8. The hinge type bistable magnetic circuit structure according to claim 1, wherein the first armature portion of the L-shaped armature is configured to use the other end of the permanent magnet as a rotational support point, so that the first armature portion is capable of swinging to cooperate with the L-shaped yoke, thereby achieving a seesaw type movement.

9. The hinge type bistable magnetic circuit structure according to claim 8, wherein:

a projecting first projection is provided on an end surface of the other end of the permanent magnet, the first projection is integrally formed with the permanent magnet, the first projection of the permanent magnet is abutted against an inner side surface of the first armature portion of the L-shaped armature, so that the first armature portion of the L-shaped armature is configured to use the other end of the permanent magnet as a rotational support point to be capable of swinging to cooperate with the L-shaped yoke; or a projecting second projection is provided on an inner side surface of the first armature portion of the L-shaped armature, and the second projection is integrally formed with the first armature portion, the second projection of the first armature portion of the L-shaped armature is configured to abut against an end surface of the other end of the permanent magnet, so that the first armature portion of the L-shaped armature is configured to use the other end of the permanent magnet as a rotational support point to be capable of swinging to cooperate with the L-shaped yoke; or a magnetic conductor is provided between the other end of the permanent magnet and the first armature portion of the L-shaped armature, one end of the magnetic conductor connected with the first armature portion of the L-shaped armature is provided with a projecting third projection, the third projection is integrally formed with the magnetic conductor, so that the first armature portion of the L-shaped armature is configured to use a corresponding end of the magnetic conductor as a rotational support point to be capable of swinging to cooperate with the L-shaped yoke.

10. The hinge type bistable magnetic circuit structure according to claim 8, wherein;

a limit rotation shaft is provided on each side of the first armature portion of the L-shaped armature in a width direction, and a center line of the limit rotation shaft is vertically intersected with a connecting line or an extension line of the connecting line from one end to the other end of the permanent magnet and passing through the rotational support point; and the bobbin is provided with a fourth projection extending toward the first armature portion of the L-shaped armature, the fourth projection is provided with a groove adapted to the limit rotation shaft of the first armature portion of the L-shaped armature, and the limit rotation shaft of the L-shaped armature is rotatably fitted in the groove of the fourth projection of the bobbin.

11. The hinge type bistable magnetic circuit structure according to claim 10, wherein:

the center line of the limit rotation shaft is coincided with the rotational support point; or the groove of the fourth projection of the bobbin is in arc contact with and is cooperated with the limit rotation shaft of the L-shaped armature; or the limit rotation shaft of the L-shaped armature is a fifth projection integrally formed on both sides in the width direction of the first armature portion of the L-shaped armature; or the first armature portion of the L-shaped armature is partially covered with a plastic member, the limit rotation shaft of the L-shaped armature is a sixth projection integrally molded on the plastic member on both sides in the width direction of the first armature portion of the L-shaped armature.

12. The hinge type bistable magnetic circuit structure according to claim 8, wherein a pressure spring is further provided and connected to the first armature portion of the L-shaped armature, and the first armature portion of the L-shaped armature is connected to the bobbin through the pressure spring.

13. The hinge type bistable magnetic circuit structure according to claim 12, wherein:

the pressure spring comprises a main piece and wings, and the wings are bent from two side edges of the main piece and protruded from one side surface, a side surface of the first armature portion of the L-shaped armature facing away from the first yoke portion of the L-shaped yoke is provided with a convex part protruding outward, the main piece is provided with a first snap-fit hole, and the first snap-fit hole of the main piece is correspondingly fitted with the convex part of the first armature portion of the L-shaped armature; and the wings of the pressure spring are configured to extend to the bobbin and are connected with the bobbin.

14. The hinge type bistable magnetic circuit structure according to claim 13, wherein a wing of the pressure spring is provided with a second snap-fit hole, a block is provided at a corresponding position of the bobbin, and the second snap-fit hole of the wing of the pressure spring is stuckly fitted with the block of the bobbin.

15. The hinge type bistable magnetic circuit structure according to claim 14, wherein the second snap-fit hole of the wing of the pressure spring is elongated, one side of the second snap-fit hole is provided with a clamping piece; the block is provided with an inclined surface on a side facing the main piece of the pressure spring, and the block is also provided with a straight surface on a side facing away from the main piece of the pressure spring; and the clamping piece of the second snap-fit hole is fitted with the straight surface of the block.

16. The hinge type bistable magnetic circuit structure according to claim 13, wherein the first armature portion of the L-shaped armature is provided with a concave portion on a side facing away from the first yoke portion of the L-shaped yoke, the pressure spring is provided with an elastic tongue corresponding to the concave portion, and the elastic tongue of the pressure spring is configured to abut against the concave portion of the first armature portion of the L-shaped armature.

17. The hinge type bistable magnetic circuit structure according to claim 1, wherein a pre-set second gap is provided between the first armature portion of the L-shaped armature and the other end of the permanent magnet; a rotation shaft is provided at each of both sides of the L-shaped armature in a width direction and corresponds to an extension line of a connecting line from one end to the other end of the permanent magnet, so as to use the rotation shaft to achieve a seesaw type movement; and the bobbin is provided with a support for supporting the rotation shaft of the L-shaped armature.

18. A magnetic latching relay, comprising:

a base, a stationary spring part, a movable spring part, a pushing card, and a hinge type bistable magnetic circuit structure, wherein:

the hinge type bistable magnetic circuit structure comprises a coil assembly, an L-shaped armature, an L-shaped yoke, and a permanent magnet;

the L-shaped armature is configured on a side of the L-shaped yoke, and the L-shaped armature and the L-shaped yoke are together formed a frame;

at two opposite diagonals of the frame, a junction of the L-shaped armature and the L-shaped yoke is provided with a pre-set first gap;

the L-shaped yoke comprises a first yoke portion and a second yoke portion, the coil assembly is arranged at and cooperated with the first yoke portion, and one end of the permanent magnet is connected with the first yoke portion of the L-shaped yoke;

the L-shaped armature comprises a first armature portion and a second armature portion which are together formed an L shape, the first armature portion of the L-shaped armature is configured to cooperate with the other end of the permanent magnet so as to be able to perform a seesaw type movement, thereby forming a bistable magnetic circuit between the permanent magnet and the structurally asymmetrical L-shaped armature and the L-shaped yoke, and realizing a switching between two stable states of the bistable magnetic circuit by using an excitation of the coil assembly; and the hinge type bistable magnetic circuit structure, the stationary spring part, and the movable spring part are mounted on the base respectively, and the pushing card is connected between the first armature portion of the L-shaped armature of the hinge type bistable magnetic circuit structure and the movable spring of the movable spring part.

19. The magnetic latching relay according to claim 18, wherein the base and the bobbin of the coil assembly of the hinge type bistable magnetic circuit structure are one-piece injection molded parts, and the base is provided with a through hole to facilitate the installation of the L-shaped armature.

* * * * *